(12) United States Patent
Williams

(10) Patent No.: US 9,497,989 B2
(45) Date of Patent: Nov. 22, 2016

(54) UTENSIL FOR RETAINING AN OBJECT IN A LIQUID BATH

(71) Applicant: Myron Williams, Douglasville, GA (US)

(72) Inventor: Myron Williams, Douglasville, GA (US)

( * ) Notice: Subject to any disclaimer, the term of this patent is extended or adjusted under 35 U.S.C. 154(b) by 0 days.

(21) Appl. No.: 14/657,027

(22) Filed: Mar. 13, 2015

(65) Prior Publication Data

US 2015/0282517 A1  Oct. 8, 2015

Related U.S. Application Data

(60) Provisional application No. 61/975,307, filed on Apr. 4, 2014, provisional application No. 62/090,005, filed on Dec. 10, 2014.

(51) Int. Cl.
*A23L 3/365* (2006.01)
*F16M 13/02* (2006.01)
*F16B 47/00* (2006.01)

(52) U.S. Cl.
CPC .............. *A23L 3/365* (2013.01); *F16M 13/02* (2013.01); *F16B 47/00* (2013.01)

(58) Field of Classification Search
CPC ....... A23L 3/365; F16B 47/00; F16M 13/02; F16M 11/32; F16M 13/00; A47F 7/00; A47B 55/00; A47B 81/02; A47B 81/204
USPC ........... 248/683, 688, 127, 158, 431, 188.7, 248/205.6, 205.5, 205.1, 205.2, 205.3, 248/205.8, 206.2, 206.3; 211/41.8, 71.01
See application file for complete search history.

(56) References Cited

U.S. PATENT DOCUMENTS

| | | | | |
|---|---|---|---|---|
| 3,310,180 | A * | 3/1967 | Neagle | A47G 25/0664 211/189 |
| 3,827,571 | A * | 8/1974 | Koutny | A47F 5/06 206/493 |
| 5,248,047 | A * | 9/1993 | Randhawa | A47F 7/19 211/124 |
| 5,862,924 | A * | 1/1999 | Dumont | A47G 25/0664 211/118 |
| 6,216,887 | B1 * | 4/2001 | Soo | A47G 25/0671 211/189 |
| 6,299,003 | B1 * | 10/2001 | Osorio | A47L 15/505 211/181.1 |
| 6,330,948 | B1 * | 12/2001 | Leto | A47J 47/20 211/65 |
| 6,364,130 | B2 * | 4/2002 | Wright | A47L 19/04 211/184 |
| 6,386,379 | B1 * | 5/2002 | Battaglia | A47B 96/00 211/106 |
| 6,543,630 | B2 * | 4/2003 | Hope | D06F 58/04 211/133.5 |
| 6,854,609 | B1 * | 2/2005 | Hettinger | A47F 7/0071 211/85.4 |
| 8,240,488 | B2 * | 8/2012 | Huang | B05B 13/0292 211/107 |
| 2006/0243685 | A1 * | 11/2006 | Monroig | A47K 1/09 211/65 |
| 2008/0173600 | A1 * | 7/2008 | Mungal | A47G 23/02 211/71.01 |
| 2010/0181458 | A1 * | 7/2010 | Liu | F16B 47/00 248/363 |
| 2010/0327130 | A1 | 12/2010 | Huang | |
| 2014/0014603 | A1 * | 1/2014 | Thompson | A47F 5/02 211/78 |

* cited by examiner

*Primary Examiner* — Nkeisha Smith
(74) *Attorney, Agent, or Firm* — Westerman, Hattori, Daniels & Adrian, LLP

(57) ABSTRACT

A utensil that retains a food item or other object in a liquid bath includes a core portion and at least one aim extending from the core portion at the upper end thereof to hover over the object to keep it fully submerged. An anchor, such as a suction cup, secures the core portion in the bath container.

10 Claims, 4 Drawing Sheets

UTENSIL FOR RETAINING AN OBJECT IN A LIQUID BATH

CROSS-REFERENCE TO RELATED APPLICATIONS

The present patent application is based on, and claims priority from, U.S. provisional Application No. 61/975,307, filed Apr. 4, 2014 and provisional Application No. 62/090,005, filed Dec. 10, 2014, both of which are incorporated herein by reference in their entireties.

BACKGROUND OF THE INVENTION

1. Field of the Invention

The present invention relates to utensils for retaining objects in a liquid bath. More specifically, the invention relates to utensils that can be employed to retain frozen objects in a liquid bath to facilitate defrosting.

2. Description of related art including information disclosed under 37 CFR §§1.97 and 1.98

The water submersion food thawing method allows frozen food to thaw quickly but not always thoroughly. When the density of the food is less than the density of the water in the container or sink, it forces the food to float resulting in partially thawed food.

When an object having a density lower than water, such as a frozen food item, is placed in a water bath, it will rise to the top of the water. This results in the object being only partially exposed to the bath.

Placing a heavier item on top of the floating object will hold the object down. However, the object will still only be partially exposed to the liquid because the heavier object that was placed on top is now covering parts of the object intended to be fully exposed to the liquid in the bath. For example, during the food preparation process, it is recommended for quicker thaw time to place frozen food in a water bath. Placing a 6 ounce piece of frozen chicken in a sink filled with 1.5 liter of water will result in the piece of chicken rising to the top of the water surface with only the bottom part being exposed to the water and the top part out of the water. Placing a heavier object such as a plate, bowl, pot or pan etc., on top of the piece of chicken will hold it down in the water bath. However, parts of the chicken will be covered by the heavier object, which will result in the chicken to still only be partially exposed to the water. The defrosting process will be uneven and take longer, increasing the risk of bacteria growth.

Presently there is no invention to assist in keeping food fully submerged during the thawing process. It is to the solution of these and other problems that the present invention is directed.

BRIEF SUMMARY OF THE INVENTION

It is accordingly a primary object of the present invention to provide a device for retaining an object, such as a frozen food item, in a liquid bath.

These and other objects of the invention are achieved by the provision of a utensil that functions as an anchor for a food item or other object in a liquid bath. In an embodiment of the invention, the utensil comprises a core portion and at least one arm extending from the core portion at the top thereof to hover over the food item to prevent it from rising to the top of the bath and ensure its full submersion. The utensil further comprises an anchor to secure the core portion in the bath container.

The anchor can be a suction cup, a hook and loop fastener, a magnet, or an adhesive affixed to the lower end of the core portion to make the utensil self-securing to the floor of the bath container.

In one aspect of the invention, the core portion is hollow. In another aspect of the invention, wings extend outwardly from the core portion at the lower end thereof to provide stability and relieve upward pressure caused by the floating object. The arms can be formed unitarily with the core portion; or they can be formed separately so as to be selectively attachable to and detachable from the core portion.

Other objects, features and advantages of the present invention will be apparent to those skilled in the art upon a reading of this specification including the accompanying drawings.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

Figure 1:
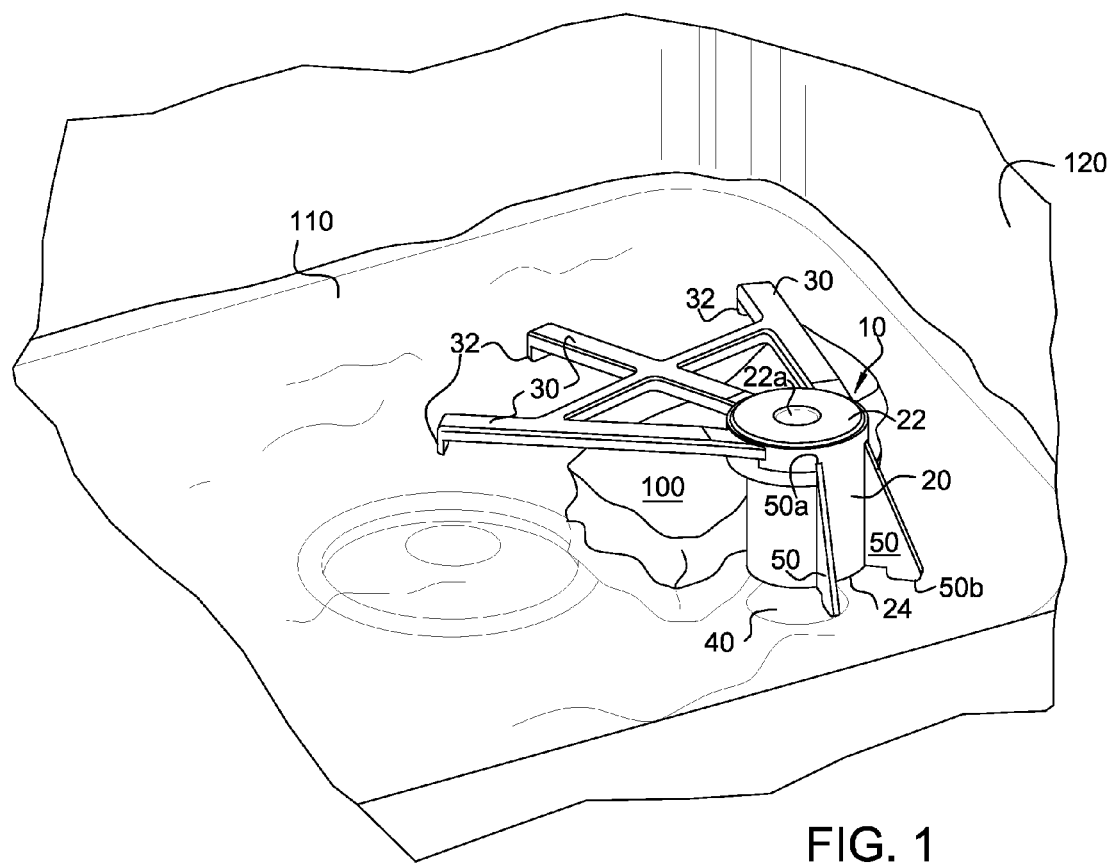
FIG. 1 is an isometric view of a first embodiment of a utensil in accordance with the present invention, in use retaining an object in a liquid bath.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Referring now to the Figures, there is shown a utensil 10 in accordance with the present invention. The utensil 10 is shown in FIG. 1 in use, retaining an object 100 in a liquid bath 110 contained in a bath container 120.

The utensil 10 comprises a core portion, at least one arm 30 extending from one end of the core portion 20, and an anchor 40 at the opposite end for securing the core portion 20 to the bath container 120.

Figure 7:
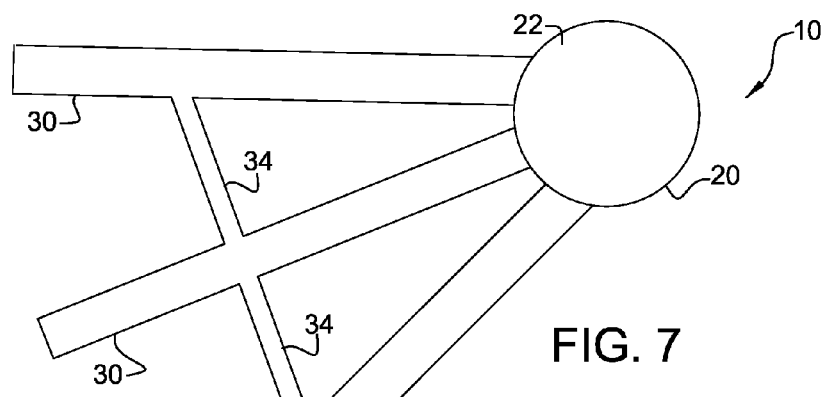
FIG. 7 is a top plan view of a second embodiment of a utensil in accordance with the present invention.
Figure 8:
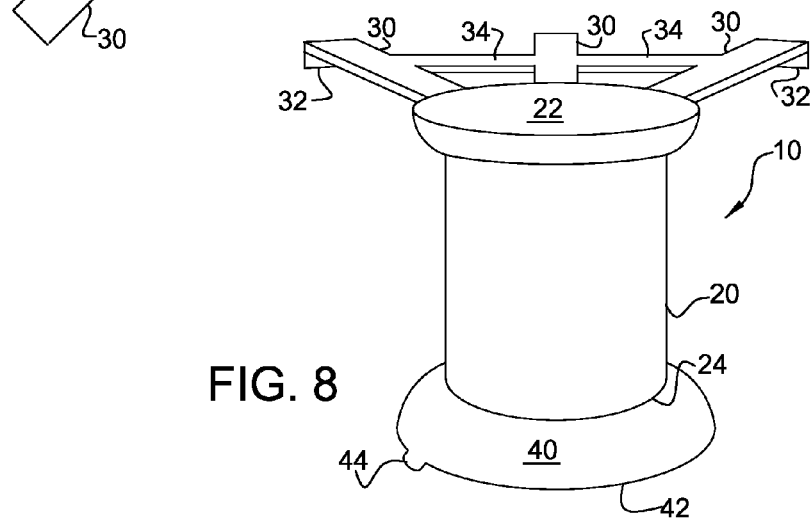
FIG. 8 is top isometric view of the utensil shown in FIG. 7.
Figure 9:
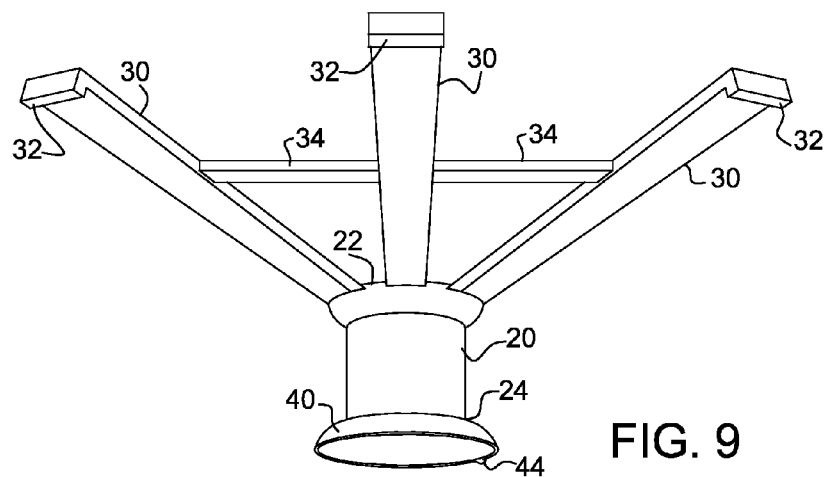
FIG. 9 is a bottom perspective view of the utensil shown in FIG. 7.

The core portion 20 has an elongated form, with upper and lower ends, and a lengthwise axis 26. As shown in FIG. 1, in use, the core portion 20 is oriented with its lengthwise axis 26 approximately vertical. The core portion 20 can be solid as shown in FIGS. 7-9, or it can be hollow as shown in FIGS. 1-6, with at least one opening 22a in the upper end 22 and at least one opening 24a in the lower end 24 to allow liquid from the bath 110 to flow through to release pressure from the liquid, as well as to facilitate manufacture and reduce the utensil's weight. In the embodiment shown in FIGS. 1-6, there is a single opening 22a in the upper end 22 and a plurality of circumferentially-extending openings 24a in the lower end 24, but it will be appreciated that the number and shape of the openings can be varied, as long as they allow liquid to flow through the core portion 20 to counteract any tendency of the utensil 10 to float.

Figure 2:
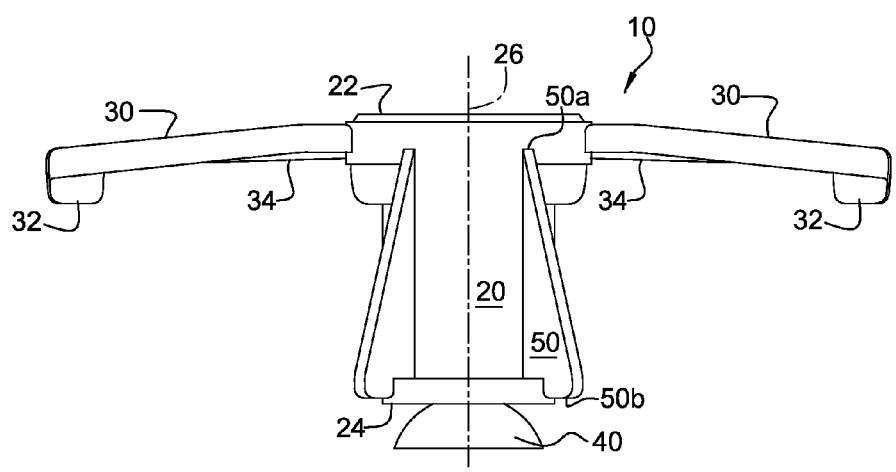
FIG. 2 is a rear elevational view of the utensil shown in FIG. 1.
Figure 3:
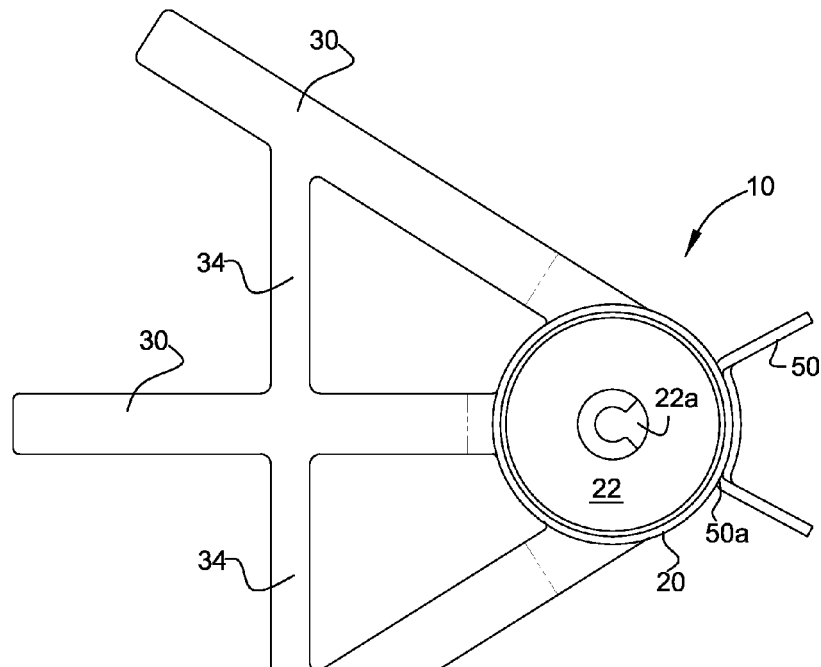
FIG. 3 is a top plan view of the utensil shown in FIG. 1.
Figure 4:
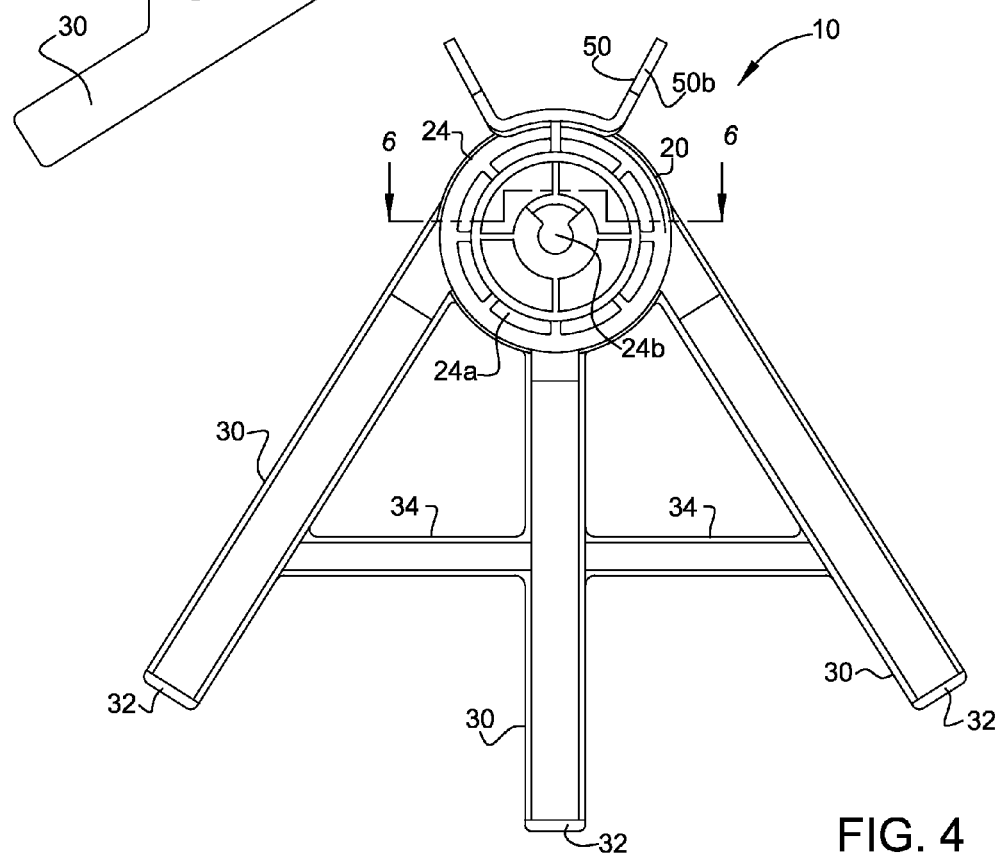
FIG. 4 is a bottom plan view of the utensil shown in FIG. 1.
Figure 5:
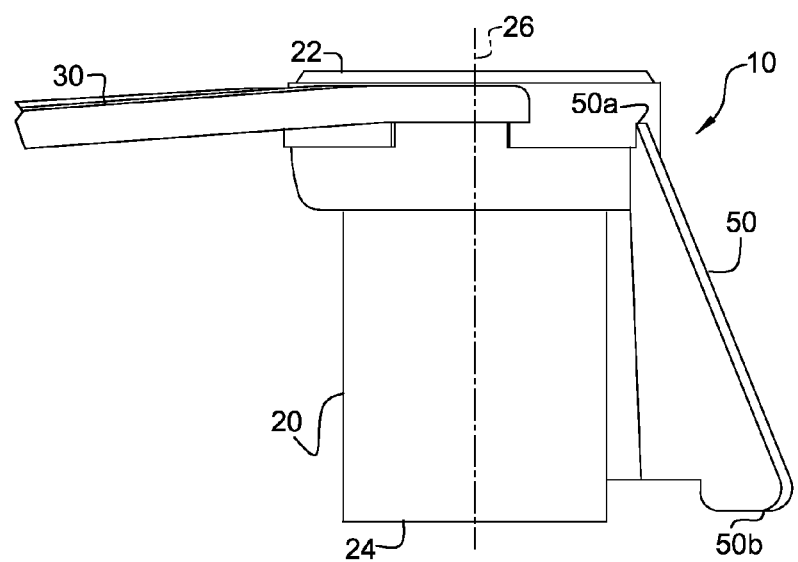
FIG. 5 is a side elevational view of the utensil shown in FIG. 1.
Figure 6:
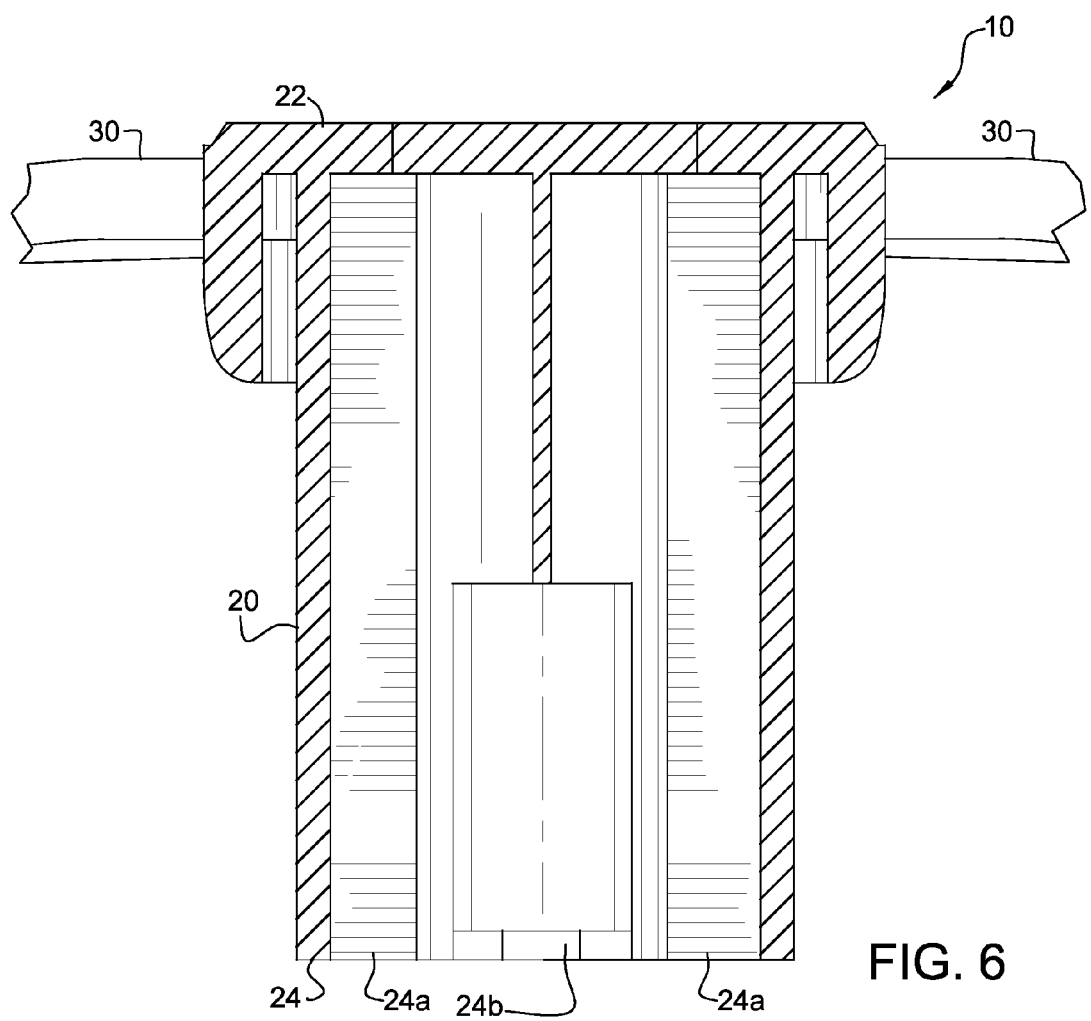
FIG. 6 is a cross-sectional view of the utensil shown in FIG. 1, taken along line 6-6 of FIG. 4.

In the embodiments shown, the utensil 10 includes three arms 30, although it can include more or fewer, depending upon the object 100 to be retained and the environment in which it is to be used. Preferably, the utensil 10 includes at least two arms 30. As best shown in FIGS. 3, 4, and 7, adjacent arms 30 form an acute angle; and in the case of three arms 30 as shown in the Figures, the two outer arms also form an acute angle. As shown in FIG. 1, the arms 30 hover over a food item to prevent the food item from rising to the top of the bath 110, which results in the object 100 being retained in the bath 110 and thus in full submersion. The arms 30 can be substantially linear, extending in a plane at an angle of approximately 90° to the lengthwise axis 26 of the core portion, as shown in FIGS. 7-9. The arms 30 can alternatively be formed with a slight arc or bend towards the core portion, as shown in FIGS. 1 and 2.

Each arm 30 is bent or curved at the tip 32 towards the lower end 24 to form a finger, which is oriented approximately vertically when the utensil 10 is in use. The fingers restrict the food item from shifting position outwardly away from the core portion, for example as the result of movement of the liquid.

Also, as shown in both embodiments, braces 34 are provided between the arms 30 for reinforcement.

In the embodiments shown in the Figures, the anchor 40 is provided at the lower end 24 of the core portion, and secures the core portion 20 to the floor of the bath container 120. The fastener can be a suction cup, a hook and loop fastener, a magnet, or an adhesive affixed to the lower end 24 of the core portion 20 by appropriate means to make the utensil 10 self-securing. For example, the core portion 20 can be formed with a keyhole opening 24b in the lower end 24 for receiving a conventional mushroom head of a suction cup. A screw or an adhesive can also be used to attach a suction cup to the lower end 24 of the core portion. The suction cup can also be molded unitarily with the core portion, by fabricating both the core portion 20 and the suction cup of a silicon material.

The type of anchor 40 used can be varied, depending upon the container for the liquid bath 110, and more particularly, on the surface of the container to which the utensil 10 is to be secured. In a typical kitchen environment, in which the liquid bath 110 is contained in a sink, pot, bowl, or tub, the anchor 40 can be a suction cup. In a party environment, containers as diverse as a swimming pool or a bathtub might be used, so a hook and loop fastener can be used as the anchor 40, with one part of the hook and loop fastener being adhered to the lower end 24 of the core portion 20 and the other part of the hook and loop fastener being adhered to the floor of the container. For use with a container that will attract a magnet, one or more magnets can be attached to the lower end 24 of the core portion 20 to serve as the anchor 40.

Preferably, the anchor 40 is made to allow removal of the utensil 10 from the bath container 120. In the case in which the anchor 40 is a suction cup, the rim 42 of the suction cup can be provided with a tab 44 to allow release of the suction.

At least one stabilizing member 50 can be provided, extending outwardly from the core portion 20. In the embodiment of FIGS. 1-6, the stabilizing member 50 is a substantially triangular wing, with the apex 50a of the wing 50 at the upper end 22 of the core portion 20 and the base 50b at the lower end 24 of the core portion. In the embodiment of FIGS. 1-6, the utensil 10 is provided with at least two wings 50. The wings 50 extend from the core portion 20 opposite to the arms 30 and provide additional stability to the flexible suction cup or other anchor 40, as well as counteracting upward pressure exerted under the arms 30 by the object 100 because of the tendency of the object 100 to rise to the surface of the liquid.

At least the core portion 20 and the arms 30 are formed of a material which is FDA approved for food contact products. Among the suitable materials are acrylics, plastic, stainless steel, silicon, rubber, wood, and other types of material which are dishwasher safe.

In use, the utensil 10 is secured to the floor of a bath container 120 containing a liquid bath 110. In the embodiment in which the anchor 40 is a suction cup, downward pressure is applied to the upper end 22 of the core portion 20 to engage the suction cup with the floor of the bath container 120. In order to ensure that the food item is completely submerged, the liquid should rise above the arms 30. The food item (or other object 100) can then be place in the bath 110, under the arms 30.

It will be appreciated that the utensil 10 in accordance with the present invention can be used to retain a variety of types of objects in a liquid bath 110, and is of particular use in situations in which the object 100 is less dense than the liquid.

The utensil 10 can be made in one piece (core portion, arms 30, and anchor 40 molded together as a unitary and integral object 100); in two parts (core portion 20 and arms 30 molded or otherwise fabricated together as a unitary and integral object 100, and anchor 40 fabricated as a separate piece attached thereto); or in three parts (core portion 20 and arms 30 molded or otherwise fabricated separately, with arms 30 inserted into the core portion 20 after molding, and anchor 40 attached thereto. When the arms 30 are molded separately from the core portion, the core portion 20 and the arms 30 can be configured so that the arms 30 can be attached for use and detached for storage.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A utensil for retaining an object in a liquid bath, comprising:
    a core portion having opposite first and second ends and a lengthwise axis;
    at least two arms extending from the core portion at the first end thereof to define a restraint for retaining an object in a submerged condition in a liquid bath, wherein each arm has a tip, arms adjacent to each other form an acute angle, and each arm is bent at the tip towards the second end of the core portion, to form a finger;

an anchor at the second end of the core portion for securing the core portion to a container containing the liquid bath; and at least one stabilizing member having a base extending from the second end of the core portion, the at least one stabilizing member being positioned relative to the at least two arms and configured to counteract an upward force exerted under the arms.

2. The utensil of claim 1, wherein the core portion is hollow, and the first and second ends both have at least one opening therein to allow liquid to flow through the core portion.

3. The utensil of claim 1, wherein the arms are formed with a bend therein towards the core portion.

4. The utensil of claim 1, wherein the anchor is a suction cup.

5. The utensil of claim 1, wherein the arms are selectively attachable to and detachable from the core portion.

6. The utensil of claim 1, wherein the anchor is selectively attachable to and detachable from the core portion.

7. The utensil of claim 1, wherein there are at least two stabilizing members and each stabilizing member is a substantially triangular wing having an apex at the first end of the core portion.

8. The utensil of claim 1, wherein the core portion and the arms comprise a unitary and integral structure.

9. The utensil of claim 8, wherein the anchor comprises a unitary and integral structure with the core portion and the arms.

10. The utensil of claim 1, wherein the at least two arms comprise first and second arms and a third arm intermediate the first and second arms, the first and second arms forming an acute angle.

* * * * *